United States Patent [19]

Smith

[11] 4,384,688
[45] May 24, 1983

[54] SELF-STORING CORD AND HOSE REEL ASSEMBLIES

[75] Inventor: John N. Smith, Tempe, Ariz.

[73] Assignee: Warren F. B. Lindsley, Phoenix, Ariz. ; a part interest

[21] Appl. No.: 266,726

[22] Filed: May 26, 1981

[51] Int. Cl.³ .......................................... B65H 75/48
[52] U.S. Cl. ............................ 242/107.7; 179/155; 191/12.2 R
[58] Field of Search ......................... 242/107–107.7, 242/100, 100.1, 100.2, 96, 86, 86.1; 191/12.2 R, 12.2 A, 12.4; 179/155, 178; 137/355.12, 355.26, 355.27

[56] References Cited

U.S. PATENT DOCUMENTS

| | | | |
|---|---|---|---|
| 2,518,071 | 8/1950 | Rushworth | 242/107.1 |
| 2,551,149 | 5/1951 | McCampbell | 242/100 X |
| 2,656,991 | 10/1953 | Neely | 242/100.1 |
| 2,976,374 | 3/1961 | Poulsen | 191/12.4 |
| 3,056,863 | 10/1962 | Johnson | 242/107.3 |
| 3,144,218 | 8/1964 | Tepe | 242/107.1 |
| 3,167,160 | 1/1965 | Vickers | 242/107.5 X |
| 3,337,695 | 8/1967 | Brown | 242/107.13 X |
| 3,450,369 | 6/1969 | Blanch et al. | 242/107.7 |
| 3,895,764 | 7/1975 | Roland | 242/107.6 |

FOREIGN PATENT DOCUMENTS

| | | | |
|---|---|---|---|
| 822381 | 11/1951 | Fed. Rep. of Germany | 242/107.1 |
| 490306 | 2/1954 | Italy | 242/107.2 |
| 691817 | 5/1953 | United Kingdom | 242/107.1 |

Primary Examiner—John M. Jillions
Attorney, Agent, or Firm—Warren F. B. Lindsley

[57] ABSTRACT

A reel for storing an extendable, retractable electrical power cord, signal cable or fluid conducting hose wherein electrical or fluid continuity is maintained throughout the process of storage and extension of the device without resort to the use of brushes, slip rings or relatively movable couplings.

9 Claims, 13 Drawing Figures

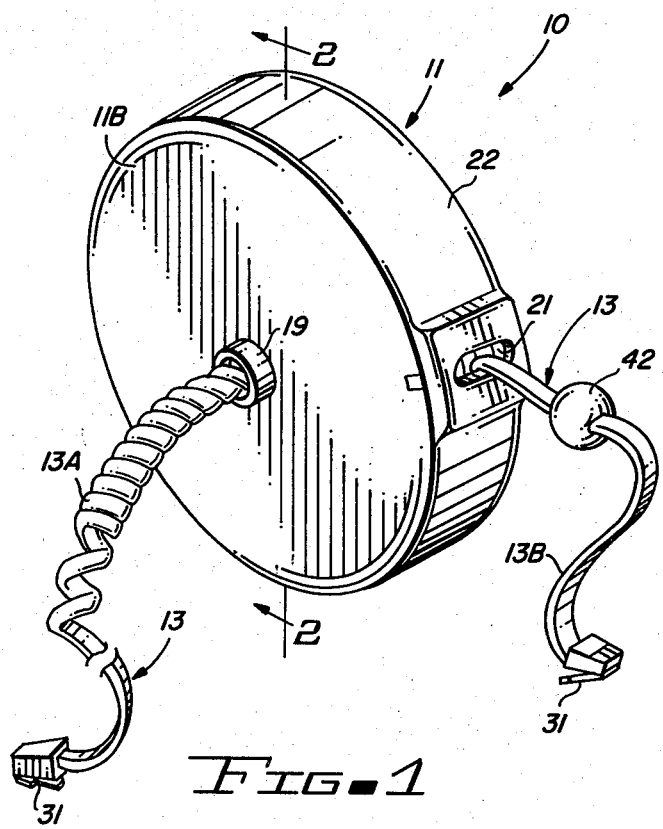
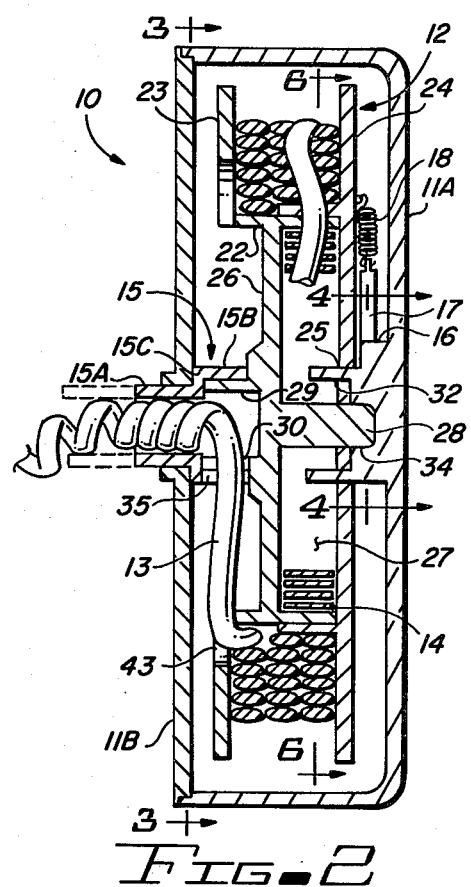
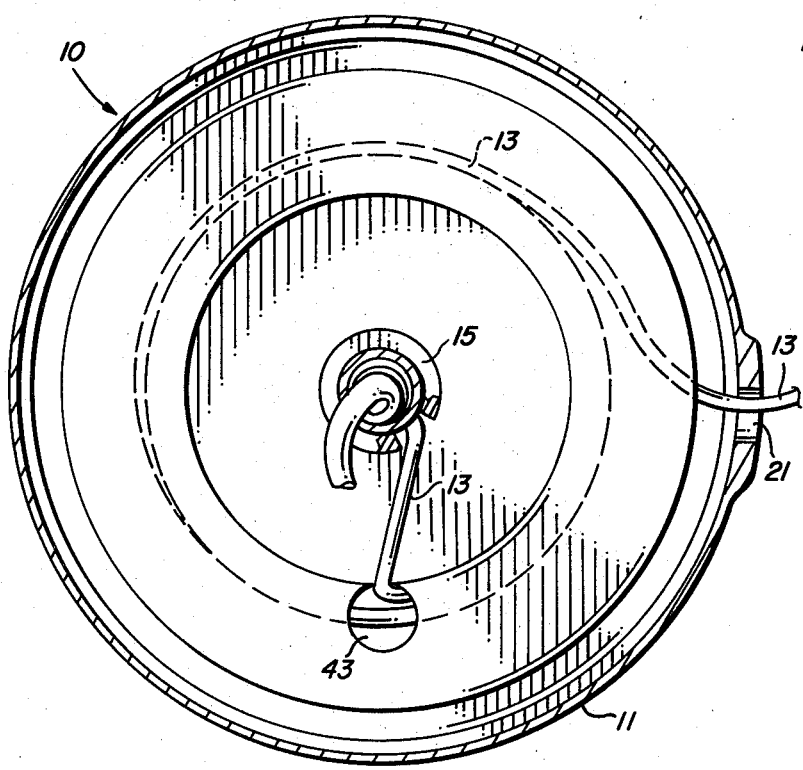
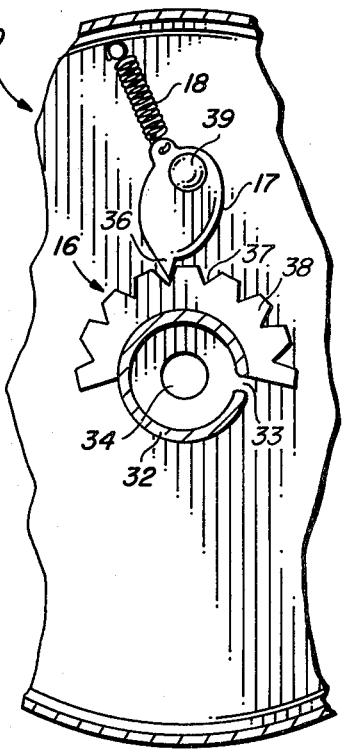

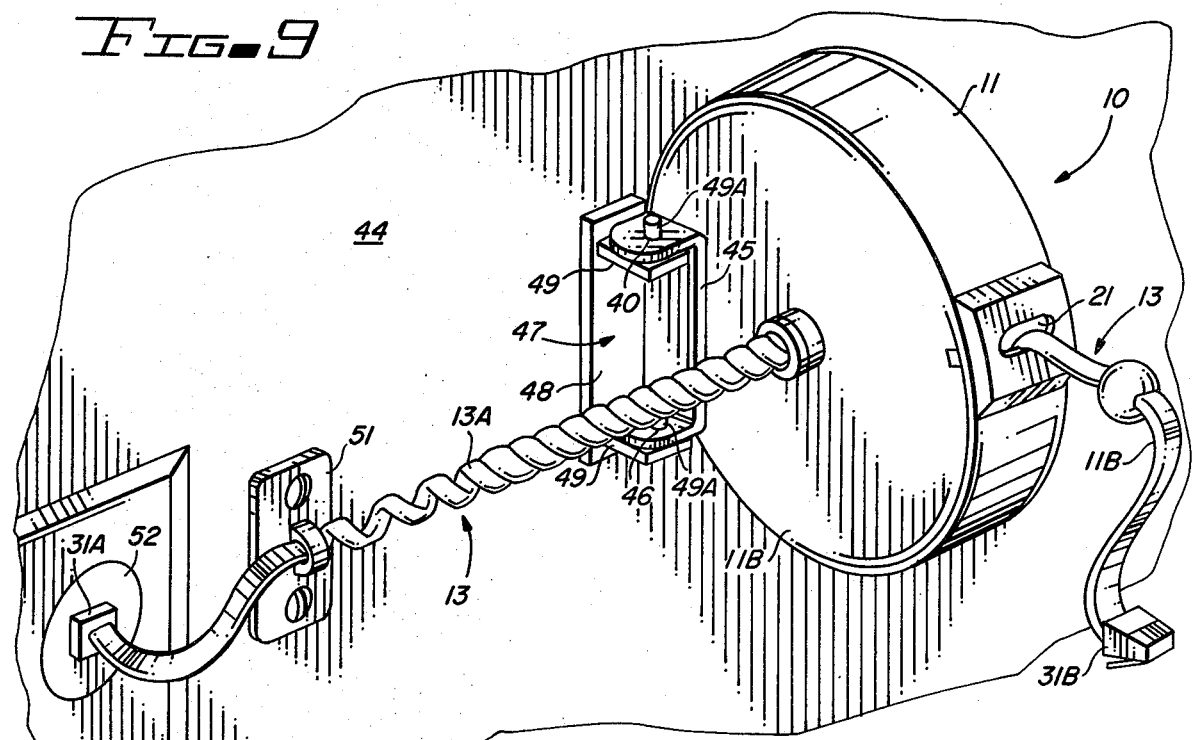
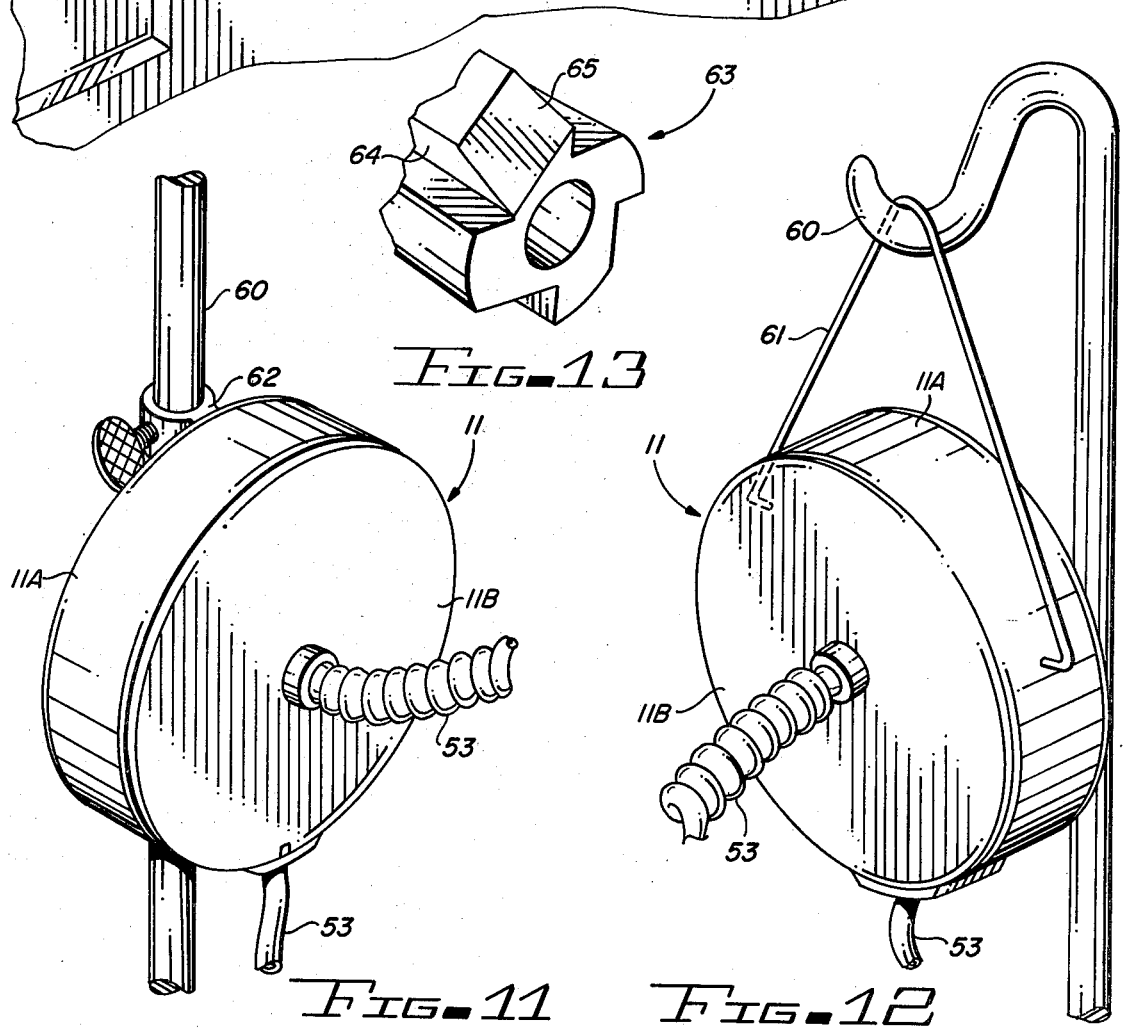

SELF-STORING CORD AND HOSE REEL ASSEMBLIES

BACKGROUND OF THE INVENTION

Long extendable electrical cords, signal cables, water hoses, air hoses and the like which preferably remain attached or connected at their source present a problem relative to storage during periods in which they are not in use.

Telephone cords have been provided in spirals so that they may be stretched out for use with the flexibility of the spiraled cord permitting it to retract partially to a more manageable length when not in use. Cords of this type, however, readily become twisted and tangled.

Various types of spring biased reels have been provided for automatically retracting the cord. To accommodate the rewinding of the cord without the attendant twisting at its connected end, commutating rings, brushes and the like have been used. In the case of water hoses, rotating fluid couplings employing O-ring seals have been employed.

DESCRIPTION OF THE PRIOR ART

One self-retracting cord reel assembly utilizes the spiraled retracting spring as an electrical conductor thereby eliminating the commutating element. Multiple nested springs provide electrical continuity for two or more electrical conductors. In cord and reel assemblies of this type, the electrical conductors are connected to the moving ends of the spiraled springs. A short connection cord is soldered to the fixed or stationary end of the spring and a plug at the free end of the connection cord is plugged into an electrical outlet or signal source.

Another type of self-retracting cord and reel set recently introduced utilizes a pair of auxiliary drums mounted inside the rotating storage reel. One of the auxiliary drums rotates with the storage reel while the other drum remains stationary and fixed to the mounting bracket. A portion of the source end of the cord is wound in opposite directions about the two drums. As the cord is withdrawn or retracted, a rotating sheave unwinds the cord from one of the auxiliary drums while winding it over the other. The winding and unwinding action on the two auxiliary drums permits the source end of the cord to remain permanently connected without twisting during storage and retraction. The cord or hose is continuous from end to end in this case, there being no commutating rings or rotating joints and no electrical connections made through the drive spring. This, however, is a relatively expensive approach to the reel storage problem.

None of the cord or hose storage reels, as described above, is totally satisfactory. Those employing commutating slip rings produce electrical noise that interferes with their use in handling signal cables, such as telephone cords. The commutating types are also subject to wear and arcing when used with electrical power cords. Where electrical connections are made through the retracting springs, the problem of insulating between the nested springs adds to the cost of such an approach. Rotating sealed joints used for fluid conduction purposes also wear out and tend to leak after an undesirably short period of use.

What is needed is a self-storing reel of the continuous cord and hose type that is simple in form and inexpensive to manufacture.

SUMMARY OF THE INVENTION

In accordance with the invention claimed, an improved self-storing reel is provided for use with electrical signal or power cables, fiber optic cables, and flexible hoses for transmitting liquids, air and gases. The reel-and-cord and reel-and-hose assemblies employ no commutating rings or sealed rotating joints but permit a continuous unbroken cord or hose from its connection at the source to its delivery end.

It is, therefore, one object of the present invention to provide an improved self-storing reel for retractable electrical and fiber optic cables and cords and for flexible fluid conducting hoses.

Another object of the invention is to provide a self-storing reel for cord and hose assemblies which is free of commutating slip rings, brushes and rotating conducting joints thereby eliminating the prior art problems of electrical noises and wear that resulted in arcing, burning and leakage of fluids or gases carried by the hoses.

A further object of this invention is to provide such a reel-and-cord or reel-and-hose assembly in which the cord and hose are continuous and unbroken from end to end.

A still further object of this invention is to provide a reel assembly in which the cord or hose may be extended or retracted freely as it unwinds or rewinds on the reel and in which provision is made to accommodate, without undesirable effects, the twisting of the cord or hose at its source end as the reel is rotated.

Yet another object of this invention is to provide such an assembly in a form that is simple in construction and inexpensive to manufacture.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings in which:

FIG. 1 is a perspective view of an improved self-storing cord and hose reel assembly embodying the invention;

FIG. 2 is a cross-sectional view of FIG. 1 taken along the line 2—2;

FIG. 3 is a cross-sectional view of FIG. 2 taken along the line 3—3;

FIG. 4 is a partial cross-sectional view of FIG. 2 taken along the line 4—4;

FIG. 5 is a perspective view of a part of the rotating reel subassembly showing a spring mounted in the spring cavity;

FIG. 11 is a perspective view of a storage cord and reel assembly of the type shown in FIGS. 1, 7 and 9 employing means for clamping it to a supporting rod;

FIG. 12 is a perspective view of the reel assembly shown in FIGS. 1, 7 and 9 employing a supporting rod or cord for hanging the assembly from a hook; and FIG. 13 is a perspective view of a modification of the post arbor shown in FIGS. 2, 4 and 5.

DESCRIPTION OF THE PREFERRED EMBODIMENT

Figure 8:
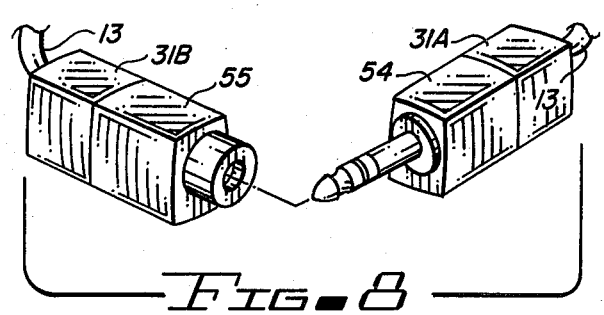
FIG. 8 is a perspective view of a pair of adaptor plugs which may be employed with various cord assemblies.

Referring more particularly to the drawings by characters of reference, FIGS. 1-8 disclose an improved self-storing cord reel or cord reel assembly 10 comprising a housing or case 11, a storage reel 12, a cord 13, a spiraled compression return spring 14, a cord clamp or retainer 15, a ratchet gear 16, pawl 17 and a coil spring 18.

Case 11 may be of any suitable geometrical configuration but is illustrated in FIG. 1 in the form of a short cylinder molded or formed in two parts. The first part 11A comprises a shallow cup and the second part 11B comprises a circular plate having a centered circular opening 19 through which the source end 13A of cord 13 and the cord clamp or retainer 15 extends. Part 11B serves as a cover for the open end of part 11A in the final assembly of cord reel assembly 10. A slot 21 in the side or cylindrical surface 22 of part 11A serves as a port for the emergence of the extendable end 13B of cord 13.

The storage reel 12 stores cord 13 in the usual manner over an outer cylindrical shelf 22 positioned between two disc-shaped side walls 23 and 24. Side wall 24 is a solid circular plate except for a small centered circular hole 25. Side wall 23 has an inner diameter equal to the diameter of the outer surface of cylindrical shelf 22 to which it is joined. The outer diameters of walls 23 and 24 are approximately equal.

A circular support wheel 26 fits inside the cylindrical shelf 22 and is joined at its outer diameter to the inner surface of shelf 22. Wheel 26 has its flat circular surface arranged parallel with wall 24 and is spaced apart from wall 24 a distance less than the width of shelf 22 so that a spring cavity 27 is formed between wall 24 and wheel 26 for the containment of spring 14. Cavity 27 is concentric with shelf 22, its outer diameter coinciding with the inner diameter of shelf 22. Wheel 26 has a first axle 28 comprising a solid circular rod extending perpendicularly from its center through coil cavity 27 and hole 25 and a second axle 29 extending perpendicularly from the center of the opposite face of wheel 26 coaxially with axle 28 and comprising a small hollow cylindrical shell. Axle 29 has a longitudinal slot 30 formed in its cylindrical wall through which cord 13 is passed.

Cord 13 is coiled at its source end over a distance of approximately twelve inches for most telephone installations but may be of other lengths depending on its use. The remaining length of the cord is not coiled with this uncoiled portion comprising the part of the cord that is stored on reel 12 for extension through slot 21. Each of the two ends of cord 13 is terminated in a connector 31 of a type depending on its use. For purposes of illustration connectors 31, shown in FIG. 1, are of the type currently employed for the connection of telephone cords.

The ratchet gear 16 is in the form of a semi-circle with teeth cut into its outer circular periphery. Gear 16 is integrally molded with part 11A of case 11 or may be rigidly secured thereto at the center of the inside surface of part 11A. The axial center of gear 16 is aligned with the center of part 11A. A post type arbor forming a spring retainer extends perpendicularly from the face of gear 16 along its axis into cavity 27 and is provided with a longitudinal slot 33 at a point on its circumference for receiving and holding the inner end of coil spring 14. A circular hole 34 is formed along the axis of gear 16 to receive the end of axle 28 in a journaled arrangement.

The cord clamp 15 comprises two adjoining cylindrical sections, 15A and 15B. Section 15A having a slightly smaller diameter than section 15B is joined thereto at their common ends by a shoulder 15C. This cord clamp is dimensioned such that section 15B fits snugly over the outer surface of axle 29, while section 15A fits snugly over a portion of the coiled section of cord 13 with a gripping action. The outside surface of section 15A fits snugly within opening 19 of part 11B of case 11 with sufficient clearance to permit free rotation therein. When clamp 15 is positioned over axle 29 a longitudinal slot 35 in section 15B may be aligned with slot 30 of axle 29 to permit passage of cord 13 through the two aligned slots 30 and 35. As shown by the dash lines section 15A may be elongated to extend over the entire coiled section of the cord.

Pawl 17 associated with the ratchet gear 16 is pivotally mounted to the outer surface of wall 24 of reel 12 in a position such that when axle 28 is journaled in hole 34, the pointed tooth 36 of pawl 17 may be dropped into one of the notches 37 between teeth 38 of gear 16. A pivot pin 39 passes through one end of pawl 17 and into wall 24 to serve as the pivotal mounting means for pawl 17. One end of spring 18 is attached to an edge of pawl 17 adjacent pin 39 and the other end of spring 18 is secured to a point on wall 24 such that spring 18 urges tooth 36 of pawl 17 into engagement with gear 16.

It should be noted from FIG. 5, illustrating in more detail the spring cavity 27, that the outer end of spring 14 is hooked into a slot 41 of shelf 22 and the inner end of spring 14 hooks into post arbor 32 as previously described.

To permit the installation of spring 14 in cavity 27, reel 12 is molded in the two parts 11A and 11B with spring 14 being installed in cavity 27 before the two parts are assembled together.

ASSEMBLY OF STRUCTURE

The claimed structure is assembled by passing the coiled end 13A of cord 13 through slot 21 of part 11A of case 11. A rubber or plastic stopper 42 attached to cord 13 prevents its uncoiled end from passing through slot 21.

The stretched out coiled end 13A of cord 13 is then passed from right to left through a hole 43 in wall 23 of reel 12 as viewed in FIG. 2. Hole 43 is located near the surface of shelf 22 with the portion of cord 13 emerging from hole 43 being pressed into slot 30 of axle 29. Cord clamp 15 is then passed over the coiled end 13A of cord 13 with section 15B thereof being pressed over axle 29 in coaxial alignment therewith while aligning slot 35 with slot 30.

Reel 12 is then positioned inside of part 11A of case 11 while inserting axle 28 in hole 34. As reel 12 is moved into position, it is rotated relative to case 11 so that pawl 17 will readily fall into place as it reaches a position opposite the toothed side of ratchet gear 16. Also as reel 12 is rotated, the inner end of spring 14 engages slot 33 of the post arbor 32.

Following the installation of reel 12 in part 11A, as just described, part 11B is positioned over the open end of part 11A while passing the coiled end 13A of cord 13 through hole 19. As part 11B is moved into place, section 15A of clamp 15 also extends through hole 19.

Figure 9:
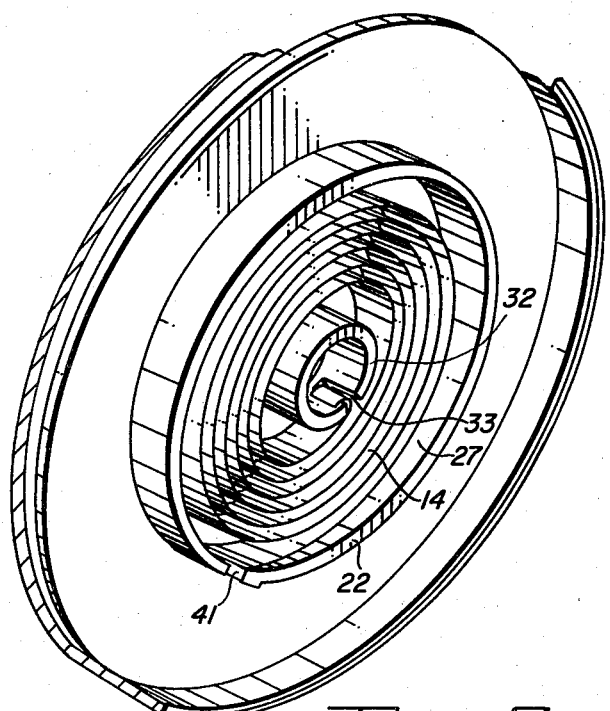
FIG. 9 is a perspective view showing one way of mounting the cord reel of FIGS. 1-6 on a wall.

When utilizing the cord reel assembly 10 for telephone installations, it may be attached to a wall or mounting plate 44, as shown in FIG. 9. For this purpose, a U-shaped bracket may be attached to the surface of part 11B of the casing. Bracket 45 is fashioned in the form of a clevis with each leg of the U-shaped bracket being pierced by a hole 46 which holes are aligned with each other. As shown in FIG. 9, bracket 45 is mounted on part 11B of case 11 at a position diametrically opposite to the position of slot 21 of part 11A when the assembly is completed and is utilized in connection with a pivotal support member 47, as shown in FIG. 9, to mount cord reel assembly 10 to the wall or mounting plate 44. Pivotal support member 47 comprises a flat plate 48 from which two spaced arms 49 extend each having a pivot pin 49A extending outwardly therefrom in axial alignment with holes 46 of bracket 45. As shown in FIG. 9, bracket 45 is mounted to member 47 in the manner of a gate hinge with pins 49A of member 47 passing upwardly through holes 46 of bracket 45. Bracket 47 may be tilted right or left but is shown tilted slightly to the left so that when not in use, the cord reel 10 will tend to swing to the left to rest against the wall or plate 44. It should be noted that bracket 45 may be fastened directly to the mounting plate of a receptacle 52 if so desired with the coiled portion of cord 13 positioned between housing 11 and receptacle 52.

Also, as shown in FIG. 9, the coiled portion 13A of cord 13 that emerges from case 11 is extended horizontally to the left along plate 44 and at a point near its termination, it is secured thereto by means of a clip 51. The connector 31A at the source end of cord 31 may be inserted into a suitable receptacle 52. The other connector 31B at the extendable end 11B of cord 13 is connected to a telephone set or other appliance served by cord 13. As heretofore noted coiled portion 13A may be housed in a rigid tube separate from or forming a portion of cord clamp 15.

When no tension is applied to the extended end 13B of cord 13, case 11 rests against the surface of plate 44, as explained earlier. When tension is applied to end 13B of cord 13 to withdraw cord 13 from case 11, case 11 pivots forward to the position shown in FIG. 9. The tension on cord 13 causes reel 12 to rotate within case 11 against the force of spring 14 with reel 12 turning on axles 28 and 29. As reel 12 rotates, cord clamp 15 and the secured part of the coiled portion of cord 13 rotate with reel 12. Coincident with this rotation, the coiled portion of cord 13 that extends from case 11 to clip 51 tends to unwind or uncoil in a relatively imperceptable fashion. The unwinding of the coiled portion 13A of cord 13 thus accommodates the turning or rotating of reel 12 as the cord is withdrawn from slot 21. The unwinding action replaces the functions of the commutators, rotating joints or conductive coiled springs of the prior art devices.

As reel 12 rotates during the withdrawl of cord 13, pawl 17, as shown in FIG. 4, is rotated counterclockwise past ratchet gear 16. During such counterclockwise rotation, pawl 17 pivots about pin 39 so that tooth 36 is dragged past teeth 38 without interference. If tension on cord 13 is released as pawl 17 is passing over the toothed portion of gear 16, spring 14 will cause reel 12 to move pawl 17 in a clockwise direction past teeth 38, in which case tooth 36 will engage one of the notches 37 and will thereby lock the position or reel 12 and prevent spring 14 from retracting cord 13. To release such locking action the user of the cord reel assembly 10 may withdraw cord 13 a short distance until the pawl clears the toothed portion of gear 16. The spring 14 will then complete the retracting action.

Because the present invention utilizes the cord itself to accommodate the rotation of the reel and requires no additional parts to provide this function, the present invention is found to be particularly cost effective. Its simple construction also permits it to perform reliably over a long period of time.

It will be recognized that cord 13 may also comprise one or more sections of different types of material interconnected into an elongated member or may be a coiled electrical conductor or signal cable of any other elongated configuration. Cables for transmission of fiber optic signals and printed circuits formed in a strip may also be coiled and employed in conjunction with the cord reel assembly 10 and in similar fashion the invention may be applied as a storage means for permanently connected extendable tubing carrying liquids or gases such as, for example, air and/or oxygen gases.

Figure 7:
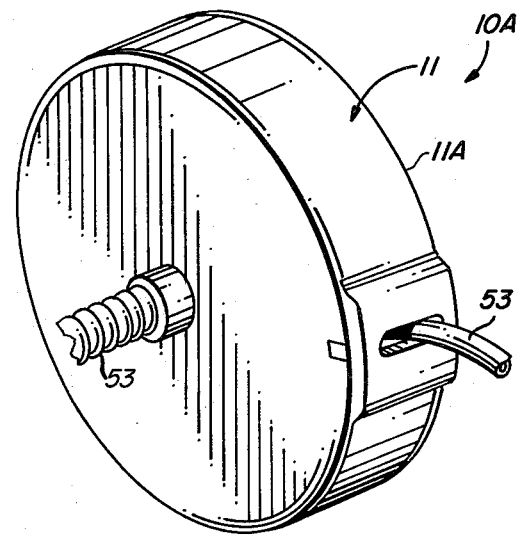
FIG. 7 is a perspective view similar to FIG. 1 illustrating a hose mounted on the reel assembly.
Figure 6:
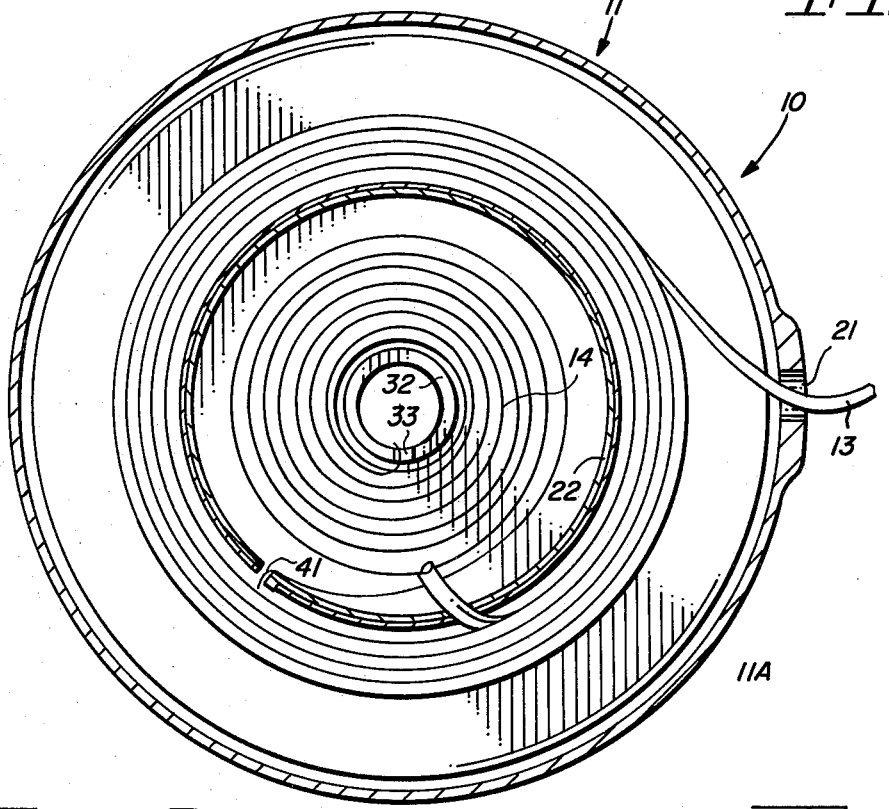
FIG. 6 is a cross-sectional view of FIG. 2 taken along the line 6—6.

FIG. 7 illustrates a reel assembly 10A identical to that shown in FIGS. 1-5 except that assembly 10A employs a fluid or air conducting hose 53 in place of cord 13 of FIGS. 1-5. Except for this difference, all other parts of the two assemblies are the same and assembly 10A functions in the same manner as heretofore explained for cord reel assembly 10.

A given user of the cord reel assembly 10 may desire additional versatility. He may, for example, wish to use one cord 13 for different purposes at different times. To accommodate such versatile application, adaptor plugs shown in FIG. 8 may be employed.

Figure 10:
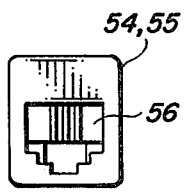
FIG. 10 is a plan view of one face of one of the adaptor plugs shown in FIG. 8.

FIG. 8 shows two adaptor plugs 54 and 55 attached to the two plugs 31A and 31B, respectively, of FIG. 9. Plug 54 employs a male phone jack at one end while plug 55 employs a female phone jack at one end thereof. The other common end of each of the plugs 54 and 55 has an opening 56 as shown in FIG. 10 to accommodate the plug 31A or 31B of the cord 13.

With the adaptor plugs attached to cord 13, as shown in FIG. 8, the cord reel assembly 10 may be employed to make signal connections between various types of electronic equipment utilizing the phone plug type of interconnection.

FIGS. 11 and 12 illustrate two different ways of mounting the housing 11 of the cord reel assembly 10. In FIG. 11 a clamp 62 secured to the flat back side of part 11A surrounds and is secured to post 60 in the usual manner. In FIG. 12 housing 11 is hung from the hooked end of post 60 by an elongated strap or cord 61 suitably secured to the outer periphery of part 11A of housing 11.

FIG. 13 illustrates a modification of the post arbor 32 shown in FIGS. 2, 4 and 5 wherein the outer surface of arbor 63 is conformed to provide a plurality of gear-like teeth 64 one of which is tapered at 65 to aid the spring end in interlocking with one of the teeth 64. These teeth are intended to engage and hold the end of spring 14 in the manner of slot 33 of post arbor 32 of FIG. 5. With this type of arbor configuration the spring end will seek one of the teeth for securing its end thereto upon rotation of the reel, thereby eliminating the need for positively inserting the end of the spring in the arbor slot as is done in the structure shown in FIG. 5.

An effective inexpensive and versatile self-storing cord or hose reel assembly is thus provided in accordance with the stated objects of the invention. Although but a single embodiment of the invention has been illustrated and described, it will be apparent to those skilled in the art that various changes and modifications may be made therein without departing from the spirit of the invention or from the scope of the appended claims.

What is claimed is:

1. A retractable self-storing reel for an elongated means such as an electrical cord, signal cable, fluid conducting hose and the like comprising:
    a casing,
    a reel journaled for rotation in said casing,
    a spring mounted within said casing to extend between said casing and said reel for rotatively biasing said reel in one direction,
    a ratchet means comprising a pawl extending between the inside periphery of said casing and said reel for restraining the rotational movement of said reel in said first rotative direction,
    a first means for providing an entranceway into said casing for the elongated means coaxially of said reel,
    said elongated means comprising a first part having a coiled portion one end of which extends into said entranceway, the remainder of said coiled portion extending outwardly of said entranceway
    said first means comprising a clamp for snugly engaging and clamping the elongated means with said reel
    a second means providing an outlet in said casing for the elongated means in an area juxtapositioned the periphery of said reel, and a second uncoiled part of said elongated means extending from said coils in said entranceway to said reel and wound therearound with the free end of said second part extending from the periphery of said reel through said outlet and out of said casing.

2. The retractable self-storing reel set forth in claim 1 wherein:
    said elongated means comprises an electrical conductor.

3. The retractable self-storing reel set forth in claim 1 wherein:
    said elongated means comprises a signal transmitting cable.

4. The retractable self-storing reel set forth in claim 1 wherein:
    said elongated means comprises a fluid conducting hose.

5. The retractable self-storing reel set forth in claim 1 wherein:
    said spring comprises a spiralled compression spring coaxially mounted in a cavity formed in said reel.

6. The retractable self-storing reel set forth in claim 5 wherein:
    said elongated means is wound on said reel at a greater radial distance from the axis of said reel than the coils of said spring.

7. A method of extruding and retracting an elongated member comprising the steps of:
    winding a center portion of an elongated means around a reel biased in one direction to maintain said center portion on said reel,
    coiling one end portion of said elongated means and extending it axially outwardly of said reel,
    holding firmly one or more coils of said elongated means to said reel,
    extending the other end of said center portion of said elongated means outwardly of the periphery of said reel,
    whereby when said other end of said elongated member is pulled to unwind said elongated member from said reel against the biasing action of said reel said coiled end of said elongated member partially uncoils.

8. The method set forth in claim 7 wherein:
    said elongated member comprises an electrical conductor.

9. The method set forth in claim 7 wherein:
    said elongated member comprises a fluid conducting hose.

* * * * *